United States Patent [19]

Perrault et al.

[11] Patent Number: 4,960,253
[45] Date of Patent: Oct. 2, 1990

[54] COMPACT LIGHTWEIGHT WIREWAY

[76] Inventors: Frederick Perrault, 1727 Date Ave., Torrance, Calif. 90503; Raymond E. Perrault, 3845 Crest Rd., Rancho Palos Verdes, Calif. 90274

[21] Appl. No.: 347,345

[22] Filed: May 4, 1989

[51] Int. Cl.$^5$ .............................................. F16L 3/22
[52] U.S. Cl. .................................... 248/68.1; 248/72
[58] Field of Search ..................... 248/68.1, 69, 72, 70, 248/73, 49, 300; 211/70.4, 207, 190

[56] References Cited

U.S. PATENT DOCUMENTS

| | | |
|---|---|---|
| 459,844 | 9/1891 | Thomas . |
| 799,092 | 9/1905 | Rosenfeld . |
| 887,272 | 5/1908 | Robinson ............................ 248/68.1 |
| 1,007,138 | 10/1911 | Peirce . |
| 1,087,302 | 2/1914 | Kobert . |
| 1,097,273 | 5/1914 | Tyler . |
| 1,229,427 | 6/1917 | Erismann . |
| 1,657,939 | 1/1928 | Rockwell . |
| 1,775,391 | 9/1930 | Fassinger . |
| 2,997,269 | 8/1961 | Urbain et al. ..................... 248/245 |
| 3,042,352 | 7/1962 | Stamper ............................. 248/68.1 |
| 3,355,132 | 11/1967 | Jenkins ................................ 248/59 |
| 3,771,665 | 11/1973 | Potter .................................. 211/107 |
| 3,794,183 | 2/1974 | Colbridge ........................... 211/176 |
| 3,888,441 | 6/1975 | Redentisch ........................... 248/73 |
| 3,923,277 | 12/1975 | Perrault et al. ................. 248/68.1 X |
| 4,013,253 | 3/1977 | Perrault et al. ................... 248/223.3 |
| 4,032,096 | 6/1977 | Perrault et al. ..................... 248/73 |
| 4,790,060 | 12/1988 | Council et al. ................. 248/68.1 X |

*Primary Examiner*—Ramon O. Ramirez
*Attorney, Agent, or Firm*—Richard F. Carr; Richard L. Gausewitz; Allan Rothenberg

[57] ABSTRACT

A wireway is provided from a unitary member, shaped as a channel, with a slotted central web for supporting cables or the like. One of the side flanges of the channel has an extension with a doubled over portion used as the attachment to a downcomer. Flanges at the opposite edges of the doubled over portion receive the downcomer. When attached to the open side of a downcomer channel, a spacer block extends between the downcomer and the doubled over portion.

12 Claims, 2 Drawing Sheets

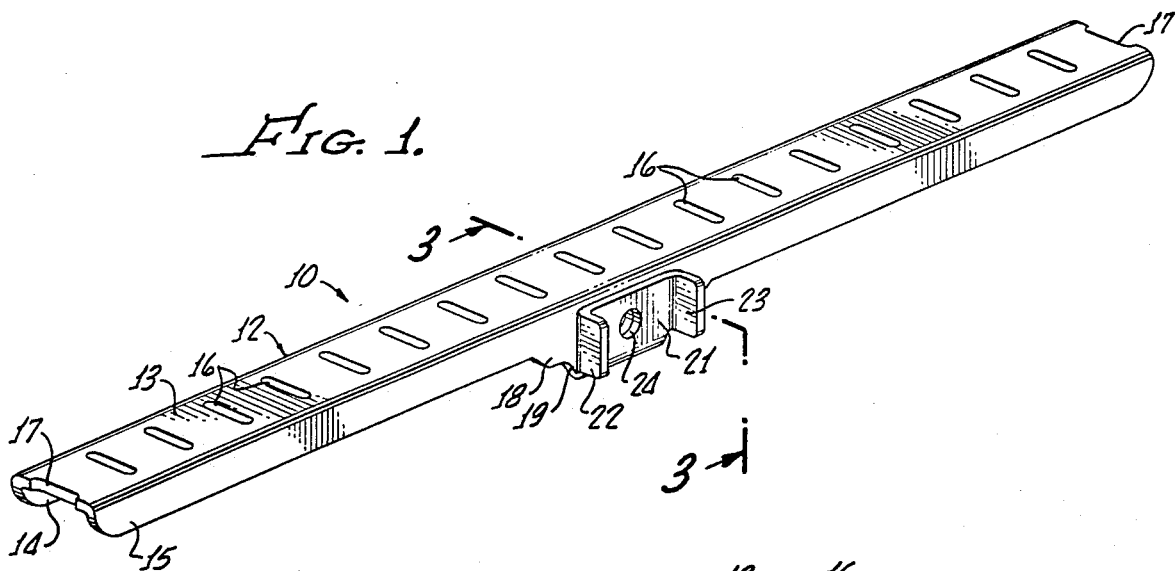
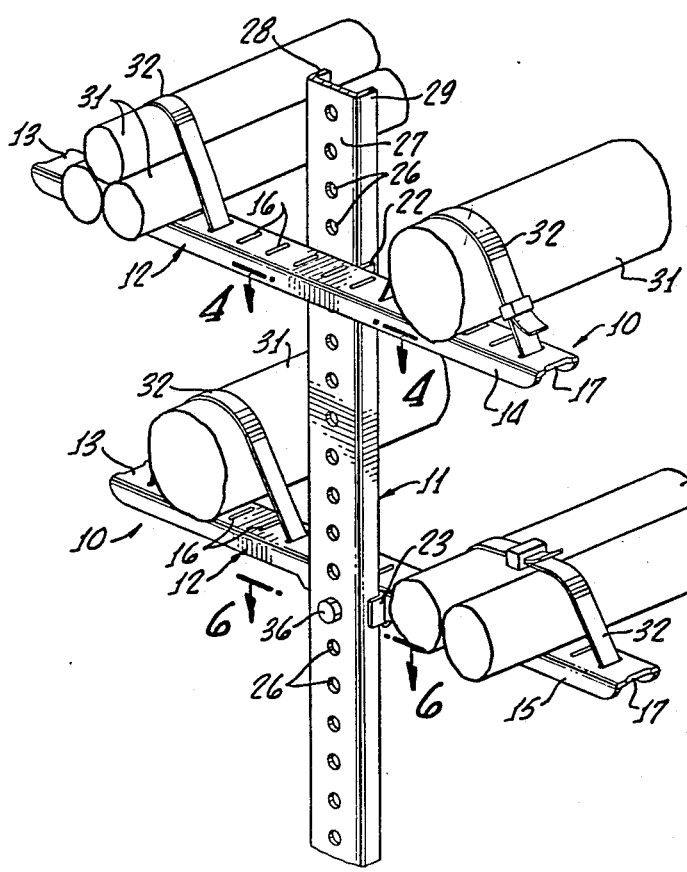
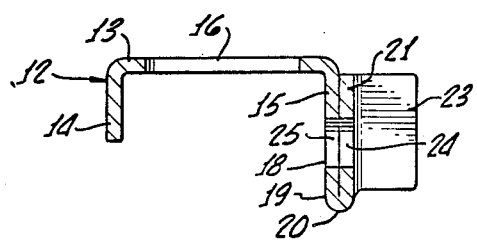
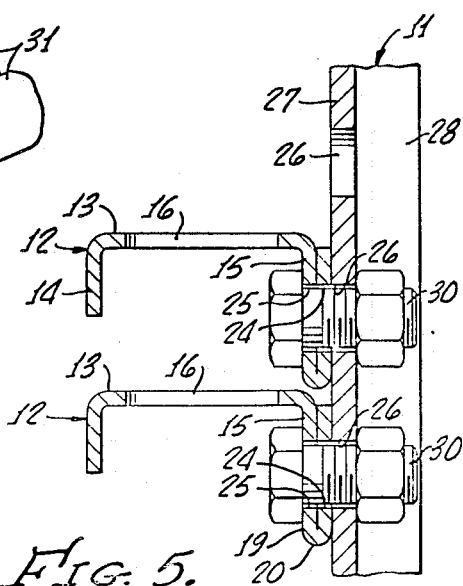

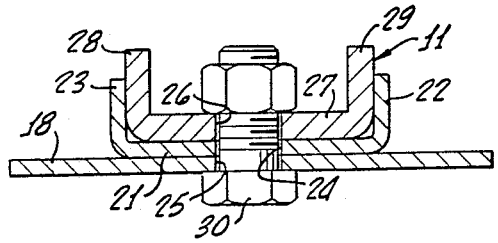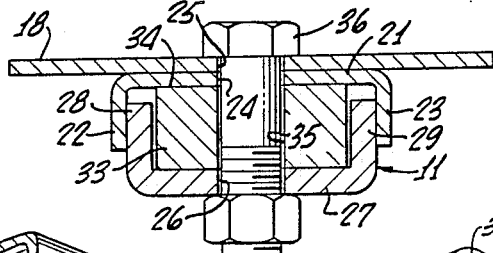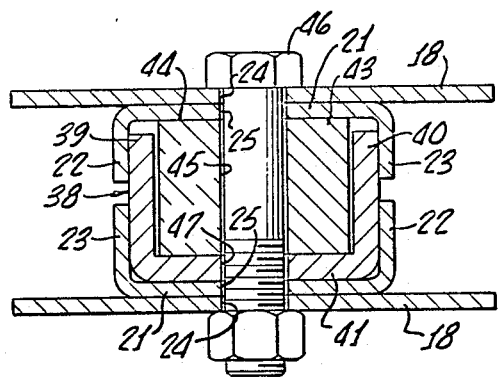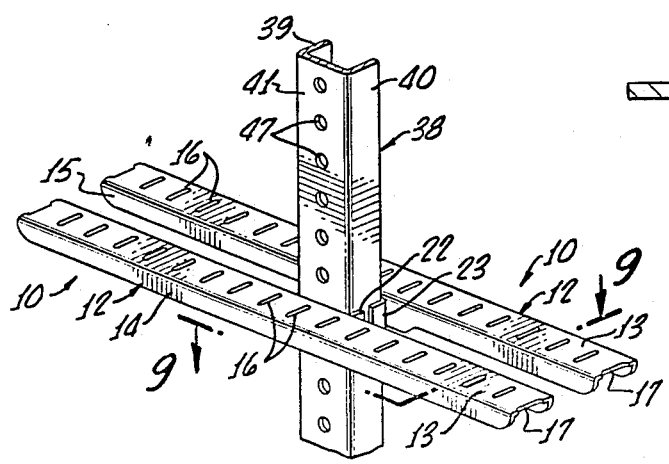

COMPACT LIGHTWEIGHT WIREWAY

BACKGROUND OF THE INVENTION

Wireways, particularly for those used in navy ships, must meet exacting standards. They are required to support cables of various sizes and weights, providing a secure support despite loads from the motion of the ship and from vibration. In some instances, available space is quite limited so the wireway should permit a dense concentration of cables.

A cable support system aboard a ship typically will include a support channel that forms a downcomer extending between the decks of the ship. Openings are provided along the central web of the downcomer so that wireways can be attached at desired locations.

A widely used wireway is a bracket that is generally L-shaped in end elevation, one flange being secured to the central web of the downcomer. This wireway has a limited load carrying capacity because the unreinforced flange that is secured to the downcomer can bend and fail under certain load conditions. Also, this wireway does not permit optimum high density of cable location because the wireways must be spaced a relatively wide distance apart along the downcomer. Two of these prior art wireways cannot be attached at adjacent openings in a standard downcomer because of the depth of the attaching flange. In addition, these prior wireways can be fastened to only one side of the downcomer, which means that a torque load is imposed on the downcomer from the cables supported by the wireways. This is undesirable and, under severe conditions, may cause the downcomer to break loose from the deck to which it is attached.

SUMMARY OF THE INVENTION

The present invention provides a superior wireway which overcomes the difficulties noted above. The device is inherently stronger than prior wireways yet is dimensioned more compactly so that the wireways may be spaced a minimum distance on the downcomer. Also, these wireways can be secured to opposite sides of the downcomer so that torque loads can be balanced on the downcomer and the possibility of failure is minimal. This also allows two wireways to be located at the same level so that the weight of heavy cables may be distributed over two wireways instead of being confined to only one.

The wireway of this invention is made up of a unitary member in the form of a channel which is positioned on the downcomer so that the central web of the channel supports the cables. Slots through the central web accommodate strapping to secure the cables to the wireway. One of the side flanges of the wireway is extended slightly and doubled over to provide two thicknesses. An opening through the doubled over portion and the flange receives a fastener that secures the wireway to the downcomer. Side flanges on the doubled over portion extend around the side edges of the downcomer, stabilizing the unit. The doubled over section provides a support of exceptional strength to withstand the loads imposed on the wireway under the severest of conditions. At the same time, the dimension of the wireway is compact so that the wireways may be closely spaced together. The wireway also can be manufactured economically and is adapted for mass production by a progressive die in a punch press.

The wireway of this invention may engage either side of the downcomer, which permits the wireways to be positioned on both sides to balance the loads on the downcomer. When attached on the open side of the downcomer channel, a spacer block is provided, extending between the central web of the downcomer and the doubled over portion of the wireway. For downcomers having relatively wide side flanges, the wireways may be attached on opposite sides at the same level. Again, a spacer block is used for the downcomer on the open side. By attaching the wireways at the same level, the load of particularly heavy cables may be distributed over two wireways rather than only one.

BRIEF DESCRIPTION OF THE DRAWINGS

FIG. 1 is a perspective view of the wireway of this invention;

FIG. 2 is a perspective view of the wireways attached to a vertical support;

FIG. 3 is an enlarged transverse sectional view taken along line 3—3 of FIG. 1;

FIG. 4 is an enlarged transverse sectional view taken along line 4—4 of FIG. 2;

FIG. 5 is a longitudinal sectional view illustrating the attachment of the wireways at adjacent openings in the support;

FIG. 6 is a transverse sectional view illustrating the attachment of the wireway to the open side of the support channel;

FIG. 7 is an exploded perspective view of the arrangement of FIG. 6;

FIG. 8 is a fragmentary perspective view illustrating the attachment of two wireways at the same level on a vertical support; and FIG. 9 is an enlarged transverse sectional view taken along line 9—9 of FIG. 8.

DETAILED DESCRIPTION OF THE INVENTION

The wireway 10 of this invention is a unitary device adapted to be attached at selected locations along a downcomer 11 which extends between the decks of a ship. One portion of the wireway 10, as shown in FIG. 1, is an elongated channel 12 which has a relatively wide central web 13 from the side edges of which project opposed parallel flanges 14 and 15. The central web 13 is provided with spaced transverse slots 16 through which strapping may be passed in securing cables to the wireway, as explained below. Notches 17 are formed in the opposite ends of the web 13 and are dimensioned like the slots but are of a depth approximately equal to half the slot width.

At the center of the wireway 10, one of the side flanges 15 is provided with a short extension 18 in the same plane which increases the depth of the flange at that location. The flange extension 18 is narrower at its outer end portion 19, at the bottom edge 20 of which is a 180° bend. This provides a flat section 21 which is doubled over the flange 15 and its extension 18. The part 21 is pressed tightly against the surfaces of the flange 15 and extension 18. Opposed parallel flanges 22 and 23 project from the opposite ends of the part 21. An opening 24 is formed in the section 21 and is aligned with an opening 25 in the portion of the flange 15 which it engages.

The downcomer 11, which is of the type commonly used on navy ships, is formed as a channel with a series of spaced openings 26 in its central web 27. Side flanges 28 and 29 project from the opposite edges of the central web 27. The wireway 10 may be secured to the downcomer 11 by fitting the U-shaped part, made up of the section 21 and its flanges 22 and 23, around the outer surface of the central web 27 of the downcomer and the two side flanges 28 and 29. A bolt 30 then is passed through the openings 24 and 25 in the wireway and one of the openings 26 in the downcomer. This securely clamps the wireway to the downcomer with rotational movement of the wireway being resisted by the side flanges 22 and 23.

With the wireway 10 in place on the downcomer 11, cables 31 are extended over the central web 13 and attached to the wireway by means of strapping 32. The strapping 32 is passed through slots 16 and around the cables 31 for holding the cables to the wireway. If one of the cables 31 is located at an outer end of the wireway, the strapping 32 may be received in a notch 17, which serves to locate and retain the strap 32. In accordance with conventional practice, the smaller cables 31 may be bundled in groups with a spacing between adjacent groups of cables. The number of cables that can be supported depends upon the length of the wireway 10, which may vary depending upon requirements.

The wireway 10 of this invention withstands heavy loads, including not only the weight of the cables 31 but also loads resulting from the motion of the ship and vibrational forces. The wireway is particularly strong because of the existence of the extension 18 of the flange 15, together with the doubled over portion 21. Two thicknesses of material resist the loads on the wireway at the location where the wireway is attached to the downcomer.

Despite the fact that the wireway 10 has a great deal of strength, it is compact, allowing the wireways to be closely spaced apart as needed. In a typical installation, where the openings 26 in the downcomer 11 are 7/16 inch in diameter with their centers spaced one inch apart, the wireways 10 may be attached at adjacent openings 26, as seen in FIG. 5. This permits a dense concentration of smaller cables 31.

The wireway 10 may be attached to the open side of the downcomer 11, as illustrated in FIGS. 6 and 7. When this is done, a spacer block 33 is positioned in the downcomer, bearing against its central web 27 and located between the side flanges 28 and 29 of the downcomer The spacer block 33, which has flat rectangular faces, is slightly thicker than the height of the flanges 28 and 29, so that its outer surface 34 is beyond the outer edges of the flanges 28 and 29. Consequently, the section 21 of the wireway 10 engages the outer surface 34 of the spacer block 33, while the opposed flanges 22 and 23 of the wireway extend around the side flanges 28 and 29 of the downcomer. An opening 35 through the center of the spacer block 33 enables a bolt 36 to extend through the wireway, the spacer block and the downcomer in effecting the attachment. The spacer block 33 transmits loads from the wireway to the central web 26 of the downcomer and assures a strong connection. This arrangement makes it possible to alternate the wireways, attaching them first on one side of the downcomer and then on the other to balance the loads on the downcomer 11, as seen in FIG. 1. This practice minimizes torque loads on the downcomer.

The downcomer 38 seen in FIGS. 8 and 9, also commonly used in ships, is similar to the downcomer 11, but with deeper side flanges 39 and 40 projecting from its central web 41. With this style of downcomer, two of the wireways 10 may be attached to the downcomer at the same level. This increases the load carrying capacity of the combined wireway assembly at any level on the downcomer. One of the wireways 10 extends over the outside of the web 41 and around the base portions of the side flanges 39 and 40 in generally the same manner as illustrated in FIGS. 1-4 for the wireway 10 and the downcomer 11. For the other wireway 10, a spacer block 43, which is thicker than the spacer block 33 of the embodiment of FIGS. 8 and 9, is positioned within the wireway 38, bearing against its central web 41. The thicker block 43 projects beyond the outer edges of the side flanges 39 and 40 of the downcomer 38. Therefore, the second wireway 10 may fit over the outside of the flanges 39 and 40, with the flat section 21 bearing against the outer surface 44 of the spacer block 43. An opening 45 in the spacer block 43 permits a bolt 46 to be extended through the opening 47 in the web 41 and the openings 24 and 25 of the wireways to accomplish the attachment.

The foregoing detailed description is to be clearly understood as given by way of illustration and example only, the spirit and scope of this invention being limited solely by the appended claims.

What is claimed is:

1. A wireway comprising a unitary member which includes an
    elongated first portion adapted to support cables or the like,
        said first portion having opposite ends and including openings therethrough for permitting fastening members to extend through said first portion for attaching such cables thereto, and
    a second portion, said second portion including,
        a first part projecting from one side of said first portion intermediate the ends thereof and having an outer edge,
        a second part joined to the outer edge of said first part and double over and bearing against said first part, and
        opposed spaced means projecting from said second part,
        said opposed spaced means being adapted to receive side portions of a channel-shaped downcomer having a central web therebetween and said second part being adapted to engage the central web of said downcomer,
    said first and second parts including aligned openings for receiving a fastener for attaching said unitary member to such a downcomer.

2. A device as recited in claim 1, including, in addition, a spacer engageable with said second part and positionable intermediate said opposed spaced means for fitting inside downcomer, said spacer having an opening therethrough alignable with said openings in said first and second parts for receiving a fastener securing said unitary member to said downcomer.

3. A device as recited in claim 1, in which said first and second parts are flat and interconnected by a bent portion.

4. A device as recited in claim 1, in which said opposed spaced means comprise a pair of flanges, one of said flanges projecting from each end of said second part.

5. A device as recited in claim 1, in which said first portion includes opposite side edges, and said second portion includes a flange connected to said first portion along each of said side edges, said flanges being in opposed relationship, said first part comprising one of said flanges, said second part extending from said outer edge of said first part toward said central web and being dimensioned so that the outer edge of said second part does not extend substantially beyond said central web.

6. A device as recited in claim 5, in which said one of said flanges includes a wider portion at the central portion of said unitary member, said second part being joined to said wider portion.

7. In combination with a support channel which includes a central web and opposed side flanges, said central web having a plurality of spaced opening means therethrough, a cable supporting device comprising a unitary member which includes
an elongated first portion adapted to support cables or the like,
said first portion having opposite ends and including openings therethrough for permitting fastening members to extend through said first portion for attaching such cables thereto, and
a second portion, said second portion including
a first part projecting from one side of said first portion intermediate the ends of said first portion and having an outer edge,
a second part connected to the outer edge of said first part and doubled over and bearing against said first part, and
opposed spaced means projecting from said second part,
a spacer received in said support channel between said opposed side flanges thereof,
said spacer having one side surface engaging said central web and an opposite side surface projecting beyond the outer edges of said opposed side flanges,
said second part engaging said opposite side surface of said spacer,
said opposed spaced means extending around the outside of said opposed side flanges,
said central web, said spacer and said first and second parts having aligned openings therethrough, and
a fastener extending through said openings for securing said unitary member and said spacer to said support channel.

8. A device as recited in claim 7, including, in addition, a second one of said unitary members in opposed relationship to said first mentioned unitary member, said second part of said second unitary member engaging said central web on the outer surface thereof, said opposed spaced means of said second unitary member extending around the outside of said opposed side flanges in a direction opposite that of said opposed spaced means of said first mentioned unitary member, said second unitary member having aligned openings through said first and second parts thereof receiving said fastener, whereby said unitary members are attached to said support channel at the same level and can cooperate to support cables or the like.

9. In combination with a support channel which includes a central web and opposed side flanges having opposite ends, said central web having a plurality of spaced opening means therethrough, a cable supporting device comprising a duality of wireways, each of which includes a unitary member shaped as a channel having a central web and opposed side flanges,
said central web having a plurality of apertures therethrough adapted to receive strapping for attaching cables thereto,
one of said side flanges of said member including an extension intermediate the ends of said one side flange and doubled over said one side flange, and provided with opposed outwardly projecting portions,
said one side flange and said extension having aligned openings therethrough,
said opposed portions of one of said members receiving said side flanges of said support channel and overlapping the same from the outer edge thereof,
said opposed portions of the other of said members receiving said side flanges of said support channel and overlapping said side flanges from the inner edges thereof, and
fastener means extending through said aligned openings of each of said members and through said opening means in said central web of said support channel for securing said wireways to said support channel.

10. A device as recited in claim 9 including, in addition, a spacer received in said support channel in intermediate said side flanges thereof, said spacer on one side thereof bearing against said central web of said support channel and on the opposite side thereof, bearing against said extension of one of said members, said spacer having an opening therethrough receiving said fastener means.

11. A device as recited in claim 10, in which said spacer is a block of material, said one side and said opposite side thereof being flat.

12. A device as recited in claim 10, in which said opposite side of said spacer is spaced outwardly of the outer edges of said side flanges of said support channel, whereby said extension of said one member engages said opposite side of said spacer and is remote from said outer edges of said side flanges of said support channel.

* * * * *